(12) United States Patent
Hung et al.

(10) Patent No.: US 11,506,788 B2
(45) Date of Patent: Nov. 22, 2022

(54) OPTICAL SENSING DEVICE AND OPTICAL SENSING MODULE

(71) Applicant: EMINENT ELECTRONIC TECHNOLOGY CORP. LTD., Hsinchu (TW)

(72) Inventors: Shang-Ming Hung, Hsinchu County (TW); Yi-Yung Chen, New Taipei (TW)

(73) Assignee: EMINENT ELECTRONIC TECHNOLOGY CORP. LTD., Hsinchu (TW)

( * ) Notice: Subject to any disclaimer, the term of this patent is extended or adjusted under 35 U.S.C. 154(b) by 361 days.

(21) Appl. No.: 15/989,139

(22) Filed: May 24, 2018

(65) Prior Publication Data

US 2019/0170874 A1  Jun. 6, 2019

(30) Foreign Application Priority Data

Dec. 5, 2017  (TW) .................................. 106142581

(51) Int. Cl.
| | | |
|---|---|---|
| *G01S 17/86* | (2020.01) | |
| *G01J 1/42* | (2006.01) | |
| *G01S 7/481* | (2006.01) | |
| *G01S 17/08* | (2006.01) | |
| *G01S 17/04* | (2020.01) | |

(52) U.S. Cl.
CPC ............. *G01S 17/86* (2020.01); *G01J 1/4204* (2013.01); *G01S 7/481* (2013.01); *G01S 7/4813* (2013.01); *G01S 7/4816* (2013.01); *G01S 17/04* (2020.01); *G01S 17/08* (2013.01)

(58) Field of Classification Search
CPC .......... G01J 1/0266; G01J 1/0488; G01J 1/06; G01J 1/0214; G01J 1/4228; G01J 1/4204; G01S 7/481; G01S 7/4813; G01S 17/026; G01S 17/08; G01S 7/4816; G01S 17/023
USPC ......................................................... 250/221
See application file for complete search history.

(56) References Cited

U.S. PATENT DOCUMENTS

| | | | | |
|---|---|---|---|---|
| 8,143,608 | B2 * | 3/2012 | Yao ........................ | G01S 7/4813 250/239 |
| 9,121,759 | B2 * | 9/2015 | Roentgen .................. | G01J 3/36 |
| 10,591,645 | B2 * | 3/2020 | Ge ............................ | G02B 1/18 |
| 2012/0019812 | A1 * | 1/2012 | Shinto ....................... | C22C 5/06 356/213 |
| 2012/0312962 | A1 * | 12/2012 | Hebert ................ | G06F 3/04883 250/206.1 |
| 2013/0324819 | A1 * | 12/2013 | Colvin, Jr. .......... | G01N 21/6428 600/342 |
| 2015/0179830 | A1 * | 6/2015 | Sugiura ................. | G01J 1/4228 257/432 |
| 2015/0243824 | A1 * | 8/2015 | Bhat ...................... | H01L 31/167 250/552 |
| 2016/0266289 | A1 * | 9/2016 | Hendrix ................ | G01J 5/0862 |

* cited by examiner

*Primary Examiner* — Seung C Sohn

(74) *Attorney, Agent, or Firm* — Muncy, Geissler, Olds & Lowe, P.C.

(57) ABSTRACT

An optical sensing device is provided. The optical sensing device includes a first optical sensor and a filter layer. The first optical sensor is configured to receive a first optical signal. The filter layer covers the first optical sensor, and is configured to filter out the first optical signal when the first optical signal is incident on the filter layer at an incident angle not within a specific range.

5 Claims, 3 Drawing Sheets

OPTICAL SENSING DEVICE AND OPTICAL SENSING MODULE

BACKGROUND OF THE INVENTION

1. Field of the Invention

The present invention relates to optical sensing, and more particularly, to an optical sensing device with a filter layer, and an associated optical sensing module.

2. Description of the Prior Art

A proximity sensor and an ambient light sensor are widely applied to portable electronic devices such as smart phones. The proximity sensor is displaced around the ambient light sensor. In the prior art, to increase the signal-to-noise ratio (SNR) of the proximity sensor, the field of view of the proximity sensor is limited by the geometrical structure of the device. For example, noise can be reduced by shrinking the opening over the proximity sensor, where the opening is for letting light enter the proximity sensor. This method has some disadvantages, however. One disadvantage is that the geometrical structure may limit the field of view of the ambient light sensor, which is not beneficial for the operation of the ambient light sensor. Another disadvantage is, as the size of the sensor gets smaller, the allowable manufacturing tolerance also becomes smaller, which makes the desired geometrical structure hard to implement.

Therefore, a novel optical sensing structure is required.

SUMMARY OF THE INVENTION

One of the objectives of the present invention is to provide an optical sensing device with a filter layer for limiting the field of view thereof, and an associated optical sensing module, to solve the aforementioned problem.

According to an embodiment of the present invention, an optical sensing device is disclosed. The optical sensing device comprises a first optical sensor and a filter layer. The first optical sensor is configured to receive a first optical signal. The filter layer covers the first optical sensor, and is configured to filter out the first optical signal when the first optical signal is incident on the filter layer at an angle not within a specific range.

According to an embodiment of the present invention, an optical sensing module is disclosed. The optical sensing module comprises: a light source, a circuit board, and an optical sensing device. The light source is displaced on the circuit board, and is configured to emit a first optical signal. The optical sensing device is displaced on the circuit board, and comprises a first optical sensor and a filter layer. The first optical sensor is configured to sense the first optical signal reflected by an object to be sensed. The filter layer covers the first optical sensor, and is configured to filter out the first optical signal when the first optical signal is incident on the filter layer at an angle not within a specific range.

The optical sensing device proposed by the present invention utilizes the characteristics of the filter layer (e.g. optical coating) to adjust/limit the field of view of the optical sensor, which not only increases the SNR of the sensor, but also increases manufacturing tolerance of package to thereby elevate the yield rate.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
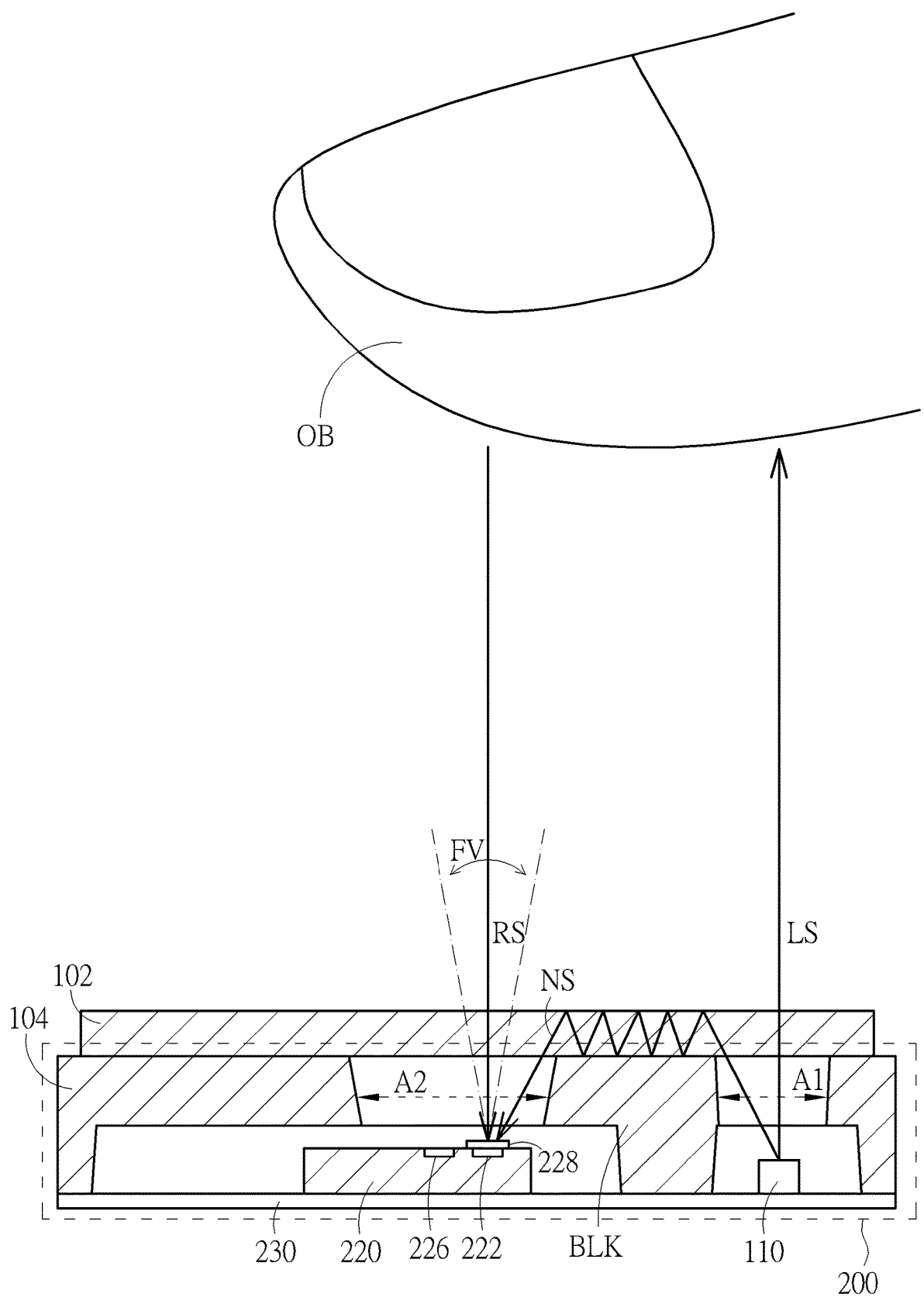
FIG. 1 is a diagram illustrating an optical sensing module according to an embodiment of the present invention.

FIG. 1 is a diagram illustrating an optical sensing module 200 according to an embodiment of the present invention. The optical sensing module 200 may be a part of an electronic device (not shown in FIG. 1), wherein the electronic device may be, but is not limited to, a portable electronic device such as a cell phone, a tablet or a laptop.

The optical sensing module 200 may comprise, but is not limited to, a structure part 104, a light source 110, an optical sensing device 220 and a circuit board 230, wherein the circuit board 230 is configured to displace the light source 100 and the optical sensing device 220. The structure part 104 comprises holes A1 and A2, and an isolation part BLK between the light source 110 and the optical sensing device 220. The hole A1 is above the light source 110 while the hole A2 is above the sensing device 220. The light source 110 is configured to emit an optical signal LS (e.g. an infrared light signal). A part of the optical signal LS is reflected by an object OB to generate the reflection signal RS which is incident on the optical sensing device 220 at an incident angle within a specific range FV. The distance between the object OB and a proximity sensor 222 (or the light source 110) is far bigger than the distance between the proximity sensor 222 and the light source 110. Hence, the reflection signal RS and the optical signal LS can be regarded as two optical signals substantially parallel to each other.

The optical sensing device 220 comprises the proximity sensor 222, an ambient light sensor 226 and a filter layer 228, wherein the proximity sensor 222 and the ambient light sensor 226 may receive different optical signals, respectively. The filter layer 228 covers the proximity sensor 222, and is configured to filter out noise NS whose incident angle is not in the specific range FV. The material of the filter layer 228 may be Silicon dioxide(SiO2), Titanium dioxide(TiO2), or Tantalum pentoxide(Ta2O5), and can be covered on the proximity sensor 222 through coating process. The proximity sensor 222 is configured to receive the reflection signal RS. The optical sensing device 220 generates a sensing output by sensing the reflection signal RS by the proximity sensor, and the sensing output is configured to determine the distance/proximity of the object OB (object to be sensed). The ambient light sensor 226 is configured to sense the ambient light, the optical sensing device 220 generates a sensing output by sensing the ambient light by the ambient light sensor 226, and the sensing output is configured to determine the intensity of the ambient light. The optical sensing device 220 can be implemented as a semiconductor device. Regarding the optical sensing device 220, the constitutions and the operation of the proximity sensor 222 and the ambient light sensor 226 are well-known to those skilled in the art. The detailed description is thus omitted here for brevity.

A glass 102 is a part of the electronic device, which is displaced above the optical sensing device 200. Apart of the optical signal LS emitted by the light source 110 is reflected by the glass 102 to generate the noise NS. The incident angle of the noise NS on the proximity sensor 222 is not within the specific range FV and the noise NS is filtered by the filter layer accordingly instead of being received by the proximity sensor 222.

The noise NS is filtered by the filter layer. Hence the signal-to-noise (SNR) of the proximity sensor 222 is increased. That is, the optical sensing device 220 has a better sensing performance for proximity sensing.

The filter layer 228 does not cover the ambient light sensor 226, meaning that the filter layer 228 does not have a negative impact on the reception of the ambient light for the ambient light sensor 226. Therefore, the ambient light sensor 226 can have a wide field of view which is beneficial for the sensing performance of the optical sensing device 220 on sensing the ambient light.

Figure 2:
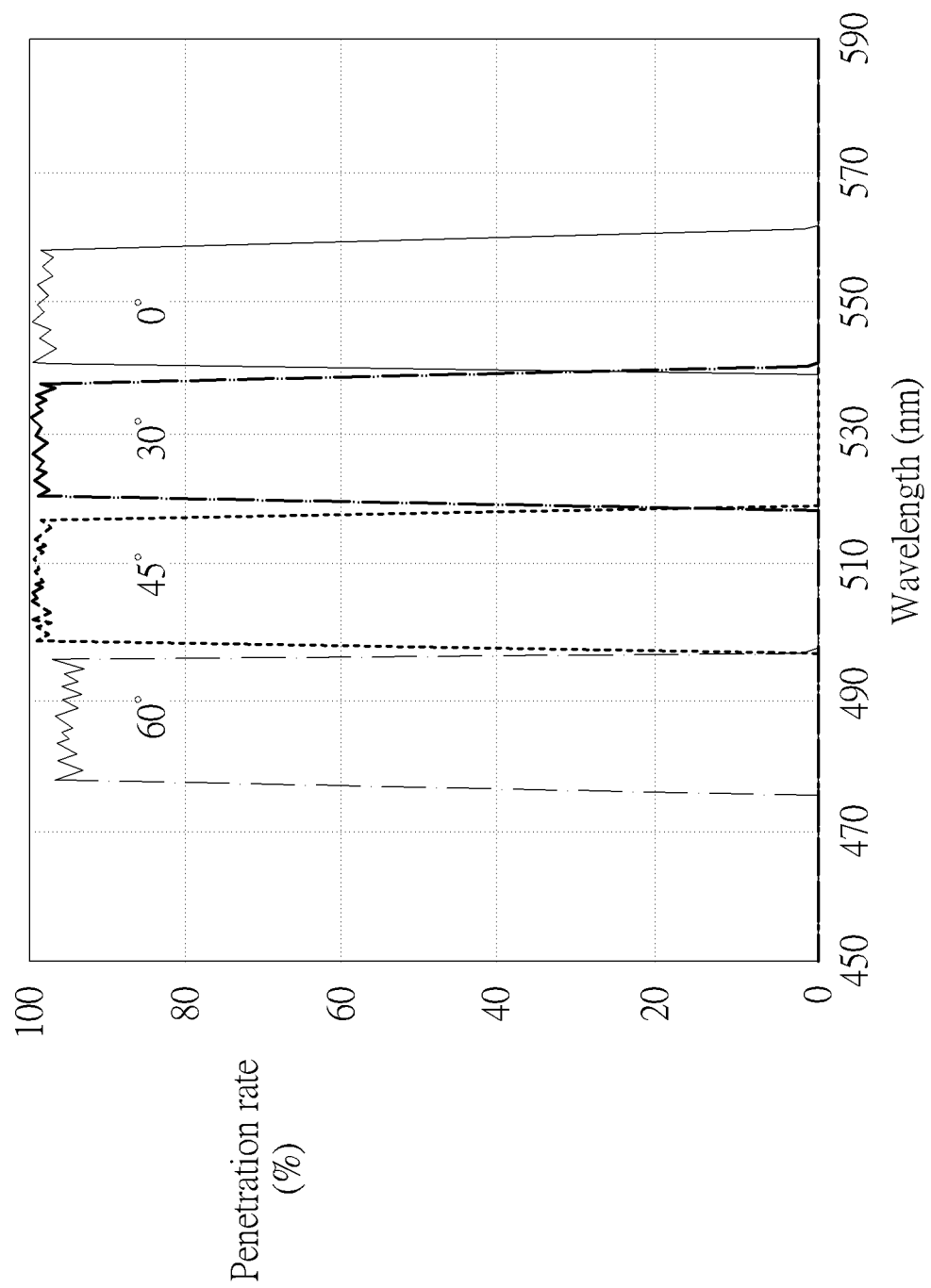
FIG. 2 and FIG. 3 interpret the optical characteristic of the filter layer shown in FIG. 1.
Figure 3:
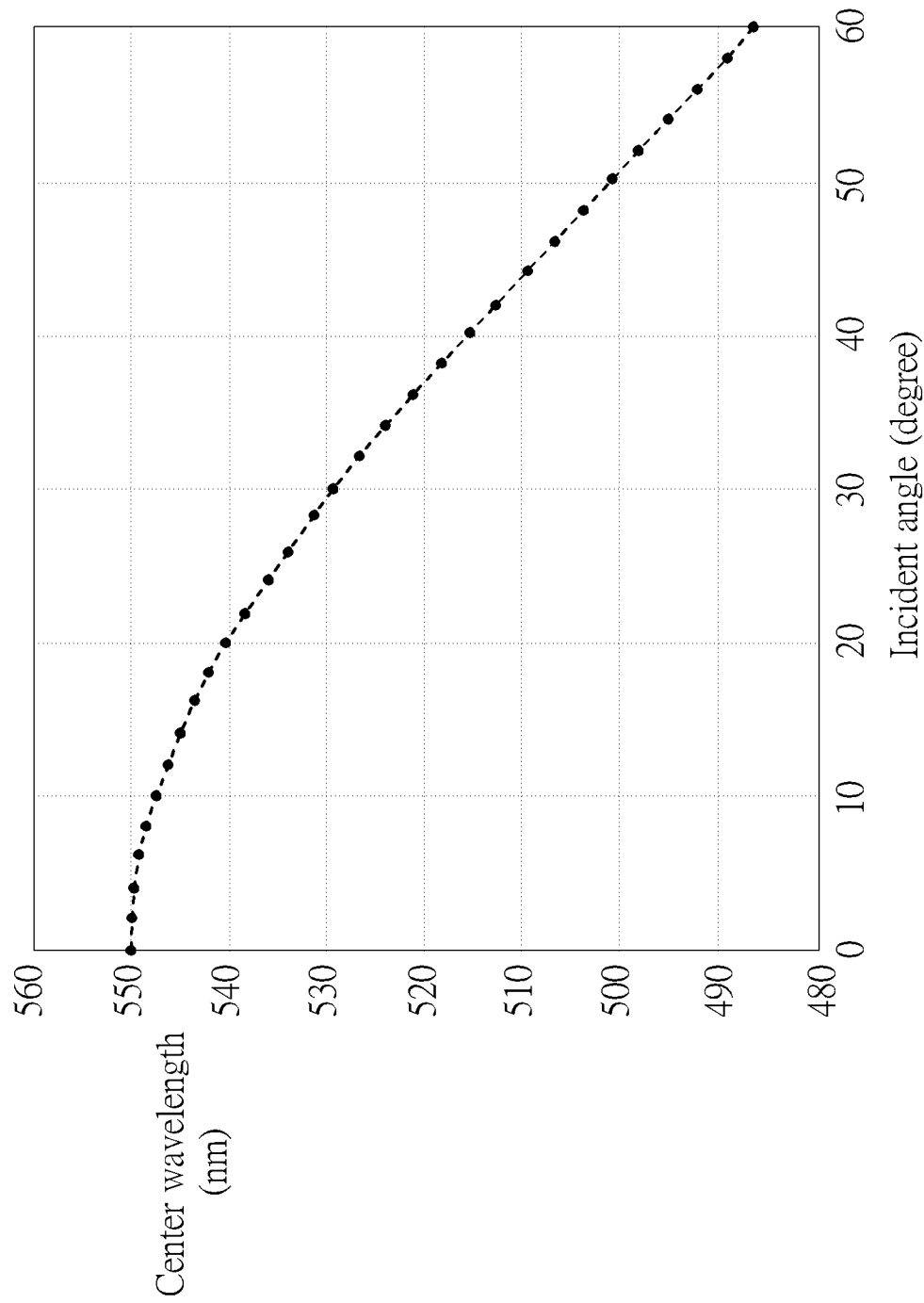

The filter layer 228 is functioned as an optical filter. The optical signal with a specific wavelength can pass through the filter layer 220 when the incident angle of the optical signal is located in the specific range. The diagrams of FIG. 2 and FIG. 3 interpret the optical characteristics of the filter layer 228. Refer to FIG. 2 and FIG. 3 in conjunction with FIG. 1. As shown in FIG. 2 and FIG. 3, the optical signal whose center wavelength is 550 nm may pass through the filter layer 228 when the incident angle is 0 degrees, and the optical signal whose center wavelength is 530 nm may pass through the filter layer 228 when the incident angle is 30 degrees. In FIG. 2, for each incident angle, the range of the wavelength of the optical signal which may pass through the filter layer 228 is about 20 nm. For example, when the incident angle is 0 degrees, the filter layer 228 allows the optical signal whose wavelength is 540-560 nm to pass through. When the incident angle is 30 degrees, the filter layer 228 allows the optical signal whose wavelength is 520-540 nm to pass through. When the incident angle is 20 degrees (not shown in FIG. 1), the filter layer allows the optical signal whose wavelength is 530-550 nm to pass through. If the light source 110 provides an optical signal whose wavelength is 550 nm, the generated reflection light can pass through the filter layer 228 when the incident angle is in the specific range 0-20 degrees. In other words, in this embodiment, the specific range FV for the field of view of the filter 228 for the incident light whose wavelength is 550 nm is about −20 to +20 degrees. The reflection light whose incident angle is not in the specific range FV will be filtered. Hence, the filter layer 228 can limit the field of view of the covered proximity sensor 222 to reduce/avoid the noise NS reflected from other objects affecting the sensing performance.

The present invention utilizes the filter layer 228 to change/limit the field of view of the proximity sensor 222 to increase the SNR without changing the geometrical structure such as by shrinking the hole A2. When a bigger hole A2 is required to make the ambient light sensor 226 receive more ambient light, the SNR of the proximity sensor 222 will not be affected. Therefore, the design of the optical sensing module 200 has more flexibility, and the requirements of the field of view of the ambient light sensor 226 and the proximity sensor 222 can also be met at the same time.

In the abovementioned embodiments, the incident light whose wavelength is 550 nm is taken for interpreting the function of the filter layer 228. This is not a limitation of the present invention, however. In other embodiments, the wavelength of the optical signal LS emitted by the light source 110 can be determined according to the application. For example, the light source 110 may be implemented by an infrared light emitting diode, which is configured to emit the optical signal LS whose wavelength is in the infrared light band, and the proximity sensor 222 is configured to sense the reflection signal RS whose wavelength is in the infrared light band.

In some embodiments, the isolation part BLK between the optical sensing device 220 and the light source 110 is not required; this can simplify the design and reduce the manufacturing costs. In some embodiments, the structure part 104 is not required by the optical sensing module 200. Removing the structure part 104 can simplify the design and reduce the manufacturing costs, thereby realizing the requirements of thin-and-light and low manufacturing costs. At the same time, the ambient light sensor 228 may receive sufficient ambient light to provide a better sensing performance.

It should be noted that the optical characteristic that the filter layer 228 having different penetration rate corresponding to lights with different incident angles is an issue which needs to be overcome in the conventional optical technology. It is expected that the filter layer allows the lights with a variety of incident angles to pass through. Taking a single lens reflex camera as an example, a red filter plate (red filter layer) is displaced in front of the lens to allow the red lights with a variety of incident angles to pass through. The filter layer 228, however, cannot fit this requirement. Therefore, the filter layer 228 has long been considered as a defect and been disregarded. The present invention overcomes this long-held technical bias by utilizing the optical characteristics of the filter layer 228 to solve the issue of poor SNR of the proximity sensor 222 and limit the field of view of the proximity sensor 222 without changing the geometrical structure of the optical sensing module 200.

Because the accuracy of the hole A2 is not required for the optical sensing module 200 proposed by the present invention, the range of manufacturing tolerance may be increased during manufacturing to improve the yield rate. Furthermore, the present invention increases the SNR of the proximity sensor, and also fits the requirements of the field of view of other optical sensors. Therefore, the optical sending device/module proposed by the present invention has achieved a technical breakthrough in comparison to the prior art.

In the aforementioned embodiments, the proximity sensor and the ambient light sensor are taken as examples, but the present invention is also applicable for other optical sensors. Hence, the optical sensing device of the present invention can be considered as an optical sensing device comprising a first optical sensor and a filter layer. The first optical sensor is configured to receive a first optical signal. The filter layer covers the first optical sensor, and is configured to filter out the first optical signal when the first optical signal is incident on the filter layer at an incident angle not within a specific range. The optical sensing device may further comprise a second optical sensor configured to sense a second optical signal, wherein the second optical signal is different from the first optical signal. In an embodiment, the first optical sensor is an infrared sensor. The optical sensing module proposed by the present invention can be considered as an optical sensing module comprising a circuit board, a light source and an optical sensing device. The light source is displaced on the circuit board, and is configured to emit a first optical signal. The optical sensing device is displaced on the circuit board, and comprises a first optical sensor and a filter layer. The first optical sensor is configured to sense the first optical signal reflected by an object to be sensed. The filter layer covers the first optical sensor, and is configured to filter out the first optical signal when the first optical signal is incident on the filter layer at an angle not within a specific range.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical sensing module, comprising:
   a circuit board;
   a light source, displaced on the circuit board, wherein the light source is configured to emit a first optical signal;
   an optical sensing device, displaced on the circuit board, wherein the optical sensing device comprises:
   a proximity sensor, configured to sense the first optical signal reflected by an object to be sensed;
   an ambient light sensor, configured to sense a second optical signal, wherein the first optical signal and the second optical signal are different; and
   a filter layer, wherein the filter layer covers the proximity sensor without covering the ambient light sensor, and the filter layer is configured to filter out the first optical signal when the first optical signal is incident on the filter layer at an incident angle outside a specific range, so as to reduce noise and increase signal-noise-ratio of the proximity sensor; and
   a structural part, comprising:
   a first hole formed above the light source;
   a second hole formed above the optical sensing device; and
   an isolation part formed between the optical sensing device and the light source.

2. The optical sensing module of claim 1, wherein the first optical proximity sensor is an infrared light sensor.

3. The optical sensing module of claim 1, wherein the light source is an infrared light diode.

4. The optical sensing module of claim 1, wherein a material of the filter layer comprises at least one of Silicon dioxide, Titanium dioxide and Tantalum pentoxide.

5. The optical sensing module of claim 1, wherein the second hole consists of a single hole.

* * * * *